(12) United States Patent
Hileman

(10) Patent No.: US 6,273,358 B1
(45) Date of Patent: Aug. 14, 2001

(54) DISPENSING/STORAGE DEVICE FOR STRAND MATERIAL, FOR EXAMPLE SOLDER

(76) Inventor: Leroy S. Hileman, 2927 115th St., Toledo, OH (US) 43611

( * ) Notice: Subject to any disclaimer, the term of this patent is extended or adjusted under 35 U.S.C. 154(b) by 0 days.

(21) Appl. No.: 09/340,292

(22) Filed: Jun. 28, 1999

(51) Int. Cl.[7] .................................................. B65H 20/02
(52) U.S. Cl. .................................... 242/564.4; 242/564.2; 226/193; 226/127; 228/41
(58) Field of Search .................. 242/564.4, 128, 242/564.2, 588.6; 226/190, 193, 127; 228/41, 244

(56) References Cited

U.S. PATENT DOCUMENTS

| 4,434,925 | * | 3/1984 | Jacobs | 242/564.4 |
| 4,944,464 | * | 7/1990 | Zalenka | 242/564.4 |
| 6,027,068 | * | 2/2000 | Lantsman | 242/564.4 |

* cited by examiner

*Primary Examiner*—John Q. Nguyen
(74) *Attorney, Agent, or Firm*—Paul F. Stutz

(57) ABSTRACT

Storage and dispensing device for elongate strand material including a spool, a tubular delivery system incorporating an integral finger-actuable friction element rotatively mounted for contact with strand material and urgement forward.

1 Claim, 1 Drawing Sheet

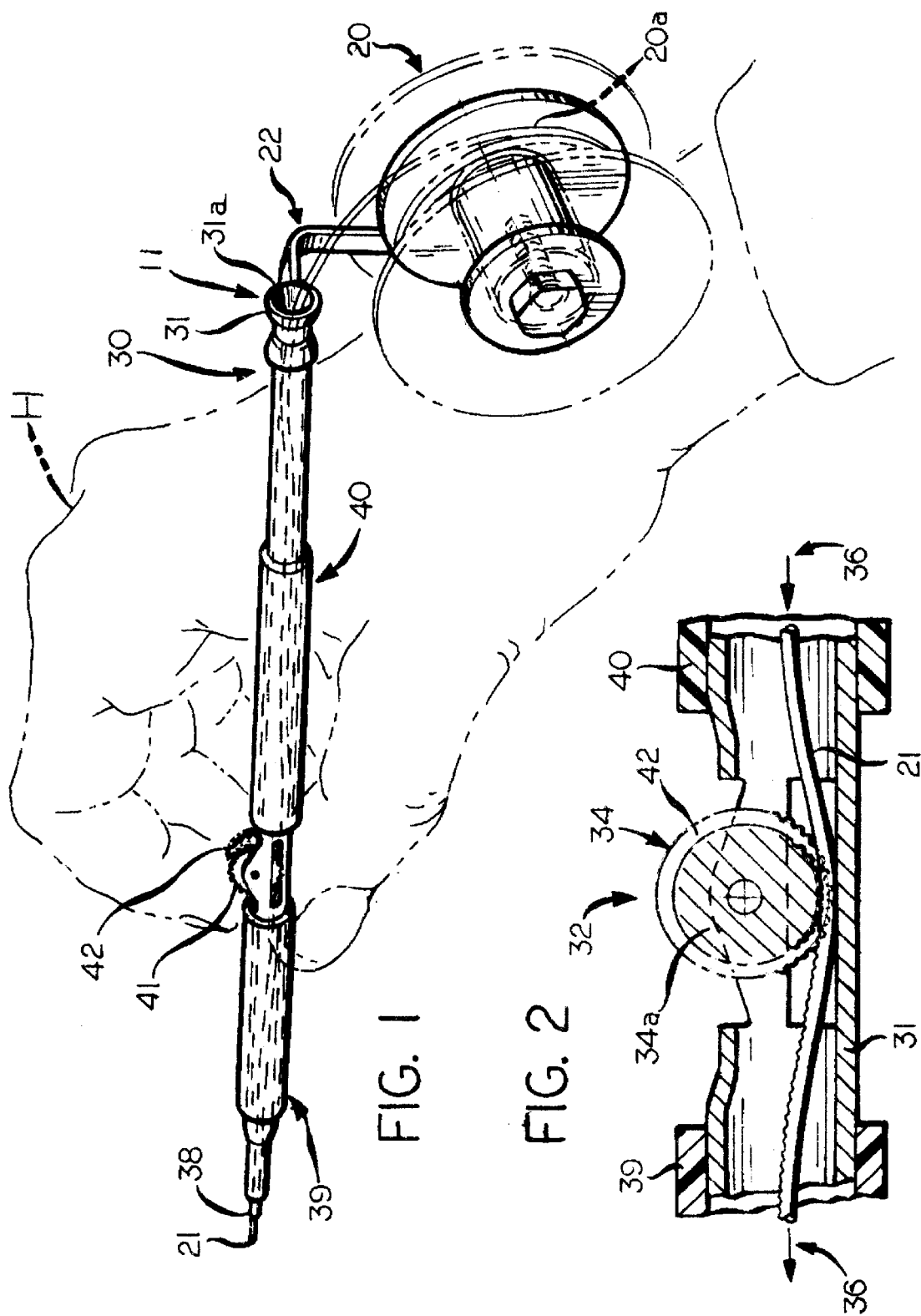

DISPENSING/STORAGE DEVICE FOR STRAND MATERIAL, FOR EXAMPLE SOLDER

The present invention relates to the tool art and more particularly to a tool of utility in the field of electrical wiring and circuitry including circuit boards and the like, etc. Even more particularly, the present invention relates to a novel tool for holding a predetermined amount or supply of electrical solder, whether solid or rosin core, and, at the same time, includes features of construction allowing manual manipulation and controlled dispensement of the solder at a given rate adapted for convenience, ease and accuracy of performing the operation of soldering.

Solder is a well-known material which is marketed and used most generally in the form of a coiled length of the solder which is packaged as a coil, or coiled length for convenience of packaging, marketing and sales.

Soldering, somewhat similar to welding, is a means of joining together two pieces of reasonably similar material for any one of a variety of reasons. In welding, parts are joined together to form a more complex part capable of operating as a decoration or a structural component of a larger assembly.

Parts, of course, can be joined/secured together by the use of screws or nuts and bolts, etc. to assemble and construct a plurality of parts held together in a predetermined assembled and secured state as desired for a predetermined use or purpose.

In the electrical field, soldering is a preferred method of joining together two, electrical-conducting wires, for example, copper, such that the conducting property of the wire can be most advantageously acheived.

An electrical circuit can be completed by joining two pieces of wire and twisting them together, or by employing any one of a number of prefabricated terminals which engage two ends of two lengths of copper wire desirably joined together. Maintenance of mechanical strength and electrical conductivity of an unimpaired degree/level is best acheived by soldering the ends together. This is accomplished by placing the two wires in proximity or adjacent or in contacting relationship, heating them with a hot element such as a soldering iron or torch, perhaps applying a flux of one sort or another and then applying the end portion of a length of solder which melts due to the heat and surrounds or encapsulates the separate wire ends joining them into a single, integral piece which is usually, if properly performed, as strong as the copper wire itself and capable of tanutting an electrical current of the desired voltage and amperage which is not diminished in any way. I am aware of the following U.S. patents which relate generally to soldering tools but which differ from my improved device/system.

U.S. Pat. No. 5,266,113; U.S. Pat. No. 4,690,318; U.S. Pat. No. 4,942,984; Des. Patent 266,980; Des. Patent 276, 500.

While the foregoing patents are disclosive of several different devices and systems for delivering a solder material or of a solder paste to exact locations; none of them are disclosive of the features of structure and operation as contemplated and acheived by my novel, unique device as described in detail hereinafter.

Most usually, in preparing to solder, the electrician or home craftsman situates himself proximate the wires or circuit boards which is to be combined with solder, together with a soldering gun connected to a suitable source of electricity or a soldering torch fileled by propane, for example. Then the package of solder is opened and the coiled length of solder removed package of solder is opened and the coiled length of solder removed whereupon the terminal end is hand bent into a somewhat straight portion which can be placed with its terminal end close to the wires. Usually, a length of 4 to 6 inches is straightened out so that the hand of the operator can be sufficiently remote from the heat as to avoid burns or the like. The wires are then heated and brought together with the solder to melt the solder. Upon contact with the heated wires, the melting then fusing and encapsulation (while holding the parts steady) creates a joined part upon cooling. The handling of the coiled supply of solder is not very convenient due to the tendency of the coil to become uncoiled. Further problems are caused by the necessity of putting down the soldering torch or gun so that the solder can be handled with both hands in order to keep a fresh length of solder exposed in linear, straight fashion for convenient, accurate and complete fusion/soldering.

Given the state of affairs and the status of the art as just hereinabove described; I have designed/invented a novel, multi-finctional tool/device and a unique method, in conjunction therewith, for accomplishing the soldering operation in a more convenient fashion which is, at the same time, more expeditious, accurate and definitely faster.

It is, accordingly, an object of the present invention to provide a novel, multi-finctional tool which obviates the difficulties hereinabove enumerated.

It is additionally an object of the present invention to provide such a tool which is quite simple, inexpensive and easily employed by anyone reasonably skilled in the art of soldering and/or handling basic tools.

It is yet another object of the present invention to provide a novel method or system of accomplishing the soldenng operation which avoids the difficulties enumerated hereinabove and which is easily practiced by one reasonably skilled in the art of soldering and handling basic tools.

It is a significant object of the present invention to provide a tool and a method which essentially provides for continuous soldering to take place without the necessity of laying down the soldering/heat-supplying tool for the purpose of hand manipulating the length of solder e.g. specifically the operative end and to do all of the above in a facile and expeditious manner.

It is also a significant and important object of the present invention to provide a tool and method which permits the soldering operation to be carried out faster, more neatly and more accurately. The foregoing objects and, as well, other objects of the present invention will become apparent to those skilled in the art from the following detailed description taken in conjunction with the annexed sheet of drawings on which is illustrated the tool and method of the present invention seen in it's simplest embodiment in two views.

IN THE DRAWINGS

FIG. 1 is an oblique/perspective view of my device shown in partly schematic fashion, with parts broken away, or seen in phantom, for purposes of more clearly illustrating the device and it's operative components.

FIG. 2 is a view of a part of the device of the present invention, shown in section, for purposes of illustrating a significant component of the present invention and it's manner of assembly and arrangement in connection with other parts of the device of the present invention.

In it's simplest embodiment the present invention comprises a system for storing and dispensing a predetermined amount of strand material, such as solder in coiled form carried, in one embodiment, on a spool as at 20, thence;

changing, while moving linearly, a terminal end of the strand material and, of course, successive portions thereafter, into an elongate or linear configuration, said elongate or linear configuration measuring from about 3 to about 8 inches in length; thence imposing/exerting an incremental forward movement on the linear strand material to move it incrementally forward in unidirectional and controllable fashion; enclosing said elongate, linear length of strand-like material or solder in a tubular structure/conduit having an inlet end and an outlet end, said lateral outlet end being proximate the size of the strand material or solder and perhaps just slightly larger, whereby the strand material emerges in a manner as to be useful and proximate to the location where the soldering operation is taking place.

In terms of a mechanism or structure, the present invention comprises a rotatable spool 20 adapted to receive and hold a continuous length of strand material, such as solder, in repeating, adjacent winds 20a proceeding from one side of the spool to the other and thence reversely, in successive layers, terminating in an end; a tubular member 30/40 of predetermined length having an inlet end 31 mounted (on end) proximate said spool and adapted to receive the terminal end 21 of said strand material such as solder, connector/bracket means attached or carried by said spool structure and being constructed and arranged to hold said tubular member with the inlet in desired position as shown, said tubular member including a centralaxial, elongate passageway 31a terminating in an exit end 38, defining an outlet opening 38 just larger in size than the strand material such as solder; movable fiction means 41/42 connected to/carried by said tubular means and being constructed and arranged to frictionally contact said strand material, such as solder, responsive to finger/manual manipulation of said movable friction means as shown schematically; said device being adapted to deliver, from the outlet end of said tubular component, a continuous length of said strand material in incremental fashion for soldering use as needed or for use in any one of a variety of soldering techniquesReferning Referring now more specifically to the drawings, there is disclosed in FIG. 1 the overall device 11 of my invention held pencil-like in the hand H of a user, said hand and the included fingers being shown in phantom lines in the interest of clarity of illustration. The device 11 includes a spool 20 having secured thereto by bracket 22; a tubular member generally identified by the numeral 30. The tubular member is elongate as shown and features a somewhat flared inlet end 31 adapted to receive the outer terminal end 21 of the strand material such as solder. The terminal end is urged laterally through the hollow passageway defined by the interior of the tubular member 30 and caused to move through an intermediate, broken-away region 32 of the tubular member 30, characterized by a friction drive element 34 mounted for rotation, as shown.

The friction element 34 comprises a pair of spaced knurled wheels 41 and 42 having mounted coaxially therebetween a somewhat smaller hub wheel 34a located, as indicated, centrally between the two outer knurled cylinders 41 and 42 (FIG. 1). The knurls on the outer circumference of the cylinders 41 and 42 provide good contact by a thumb or forefinger of the operator. As shown in the drawings, a forefinger or index finger contacts the knurled cylinders 41/42 to move them in a clockwise direction. At the same time, the central, knurled hub wheel 34a, concentrically mounted respecting the knurled cylinders 41/42 frictionally contacts the strand material, such as solder, proceeding in the direction indicated by the arrows 36 and as shown in FIG. 2. The strand material 21 is somewhat squeezed/compressed between the knurls of the smaller hub 34a and the cylinder wall 31, whereby a positive fictional engagement and consequent movement in the direction indicated 36 is accomplished.

This positive engagement between the knurled surface of wheel hub 34 also exerts a positive tension or pulling action upon the strand material wound on the supply spool 20 whereby the continuous length of strand material, such as solder, 22 is pulled from the spool and urged in continuous controllable fashion into the inlet end of the tubular member 30 thence through and past the friction drive element and thence out the outlet opening 38 from which the terminal 21 of the solder is shown proceeding in linear fashion for convenient w use in a soldering operation by reason of it's uniform, directional attitude in linear fashion. This linear fashion, of course, is acheived by the progress of the strand material, such as solder, from the spool through the tubular member as urged by finger manipulation of the drive element referred to by the numeral 34.

For ease and improved handling, the tubular device bears a pair of spaced, somewhat larger sleeves 39 and 40 in surrounding flush relationship on either side of the region 32. These are therefore capable of easier hand/finger manipulation of the device to accomplish the intended purpose as described herein.

Referring now to the totality of the drawings, it can be seen that the device 11 of the present invention constitutes a convenient and utilitarian, hand-held tool including features of storage and manipulation which allows a length of solder to be incrementally urged from a cylindrical, easily hand-held implement for accurate location or positioning of the solder adapted to be otherwise occur in attempting to handle the coiled solder without benefit of this novel device.

It will be appreciated from the foregoing detailed description that the device of the present invention will likely find wide acceptance and use, in trade schools, for example. This device will also be useful in the field of electrical appliance repair and in the field of heating, air conditioning and refrigeration. Last, but not least, the device will find application in the repair of electronics of all kinds. In all of the above, the application will include manufacturing, maintenance and repair.

As previously indicated, the prior art technique of simply using the hands necessitates frequently putting down the solder source or the heat source in order to better position the solder with respect to the copper wires for example for accomplishment of the intended soldering operation.

While I have disclosed a singular embodiment of the novel device of the present invention, it will be appreciated that changes and modifications may be resorted to without departing from the spirit and scope of the present invention, and it is intended to include all such obvious modifications and changes, unless to do so would be violative of the scope of the appended claims.

What is claim is:

1. A portable, hand-held, tool device for storing and incrementally dispensing a continuous length of solder stand material, said device including:
   (1) an elongate, hollow, tubular, generally pencil-like member having an inlet end for solder and a outlet end for solder in linear configuration,
   (2) a rotatable spool for holding a coiled, supply length of solder strand material; and
   (3) means including a generally L-shaped bracket for rigidly connecting said elongate, hollow, tubular pencil-like member to said rotatable spool;
      (a) said elongate, hollow, tubular pencil-like member, having a cut away region suitable for a rotatable fiction element mounted therein for rotation in said cut away and being constructed and arranged for manual urgement of said strand material into said inlet end, and linearly through said elongate, hollow, tubular pencil-like member and out said outlet end;

(b) said generally L-shaped bracket including a first leg having an apertured distal end carrying/receiving said elongate hollow tubular pencil-like member and the other leg having means for rigid securement of said spool in offset relationship with respect to the central longitudinal axis of said elongate, hollow, tubular pencil-like member, (c) the secured connection of said bracket to the spool allowing said spool to be partially supported on the wrist of the user, and at the same time positioning said rotatable friction element to be properly located for contact by the thumb and forefinger of the user in the desired manner;

whereby solder carried on said spool is manually urged incrementally from said spool, through the pencil-like member and linearly out the outlet end to the precise region where needed for the solder operation.

* * * * *